United States Patent [19]

Studer

[11] 4,232,506
[45] Nov. 11, 1980

[54] METHOD AND APPARATUS FOR RECOVERING TOMATOES FROM SEVERED VINES, EMPLOYING A ROTATED AND OSCILLATED SHAKER

[75] Inventor: Henry E. Studer, Davis, Calif.

[73] Assignee: The Regents of the University of California, Berkeley, Calif.

[21] Appl. No.: 51,846

[22] Filed: Jun. 25, 1979

[51] Int. Cl.³ ............................................. A01D 45/00
[52] U.S. Cl. .............................. 56/327 R; 130/30 R; 171/14; 171/129; 209/616; 209/690
[58] Field of Search ............... 209/689, 690, 664, 616; 56/327 R; 171/14, 128, 129, 127; 130/30 R

[56] References Cited

U.S. PATENT DOCUMENTS

| | | | |
|---|---|---|---|
| 1,743,240 | 1/1930 | Ryder | 209/616 |
| 2,466,089 | 4/1949 | Esch | 130/30 R |
| 2,911,981 | 11/1959 | Bauer et al. | 130/30 R |
| 3,059,648 | 10/1962 | Burton | 130/30 R |
| 3,645,271 | 2/1972 | Arve et al. | 130/30 R |
| 3,986,561 | 10/1976 | Bettencourt et al. | 130/30 R |
| 4,174,755 | 11/1979 | Siri | 130/30 R |

Primary Examiner—Paul J. Hirsch
Attorney, Agent, or Firm—Owen, Wickersham & Erickson

[57] ABSTRACT

Method and apparatus for mechanically removing tomatoes from their vines after the vines have been severed from their roots and lifted aboveground. The severed and lifted vines are fed in between a rotary shaker and stationary guides, for example, a rotary drum with radially outwardly projecting rods and arcuate guide rods around the drum. The vines are shaken by subjecting them to angular acceleration and deceleration while the vines are transported around an arcuate path. The tomatoes shaken from the vines are collected, and the stripped vines are dropped back on the ground.

37 Claims, 20 Drawing Figures

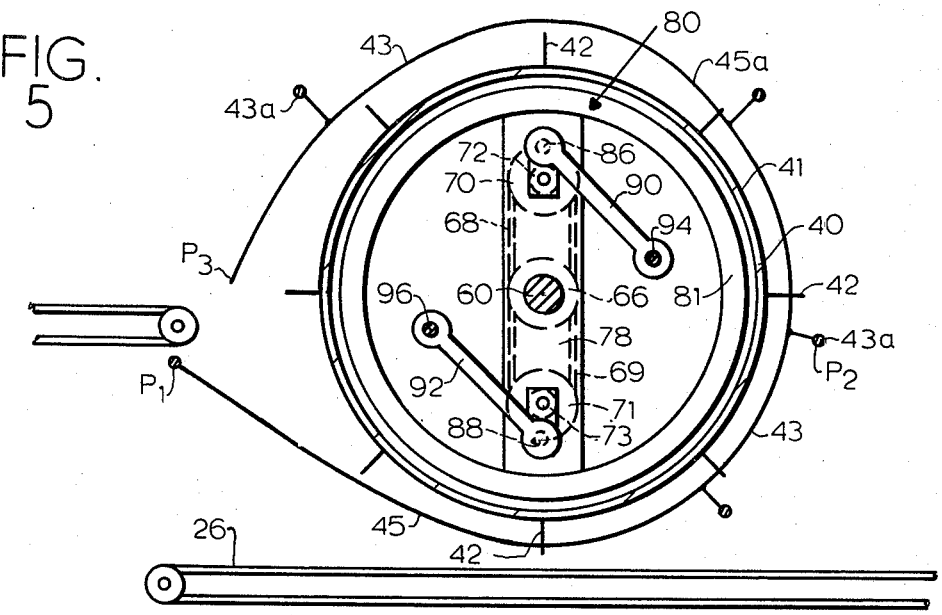
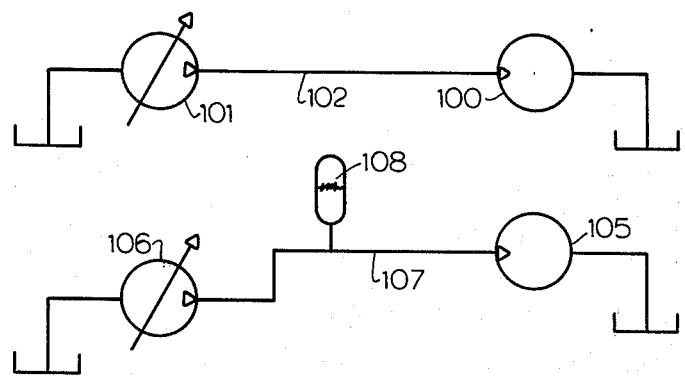
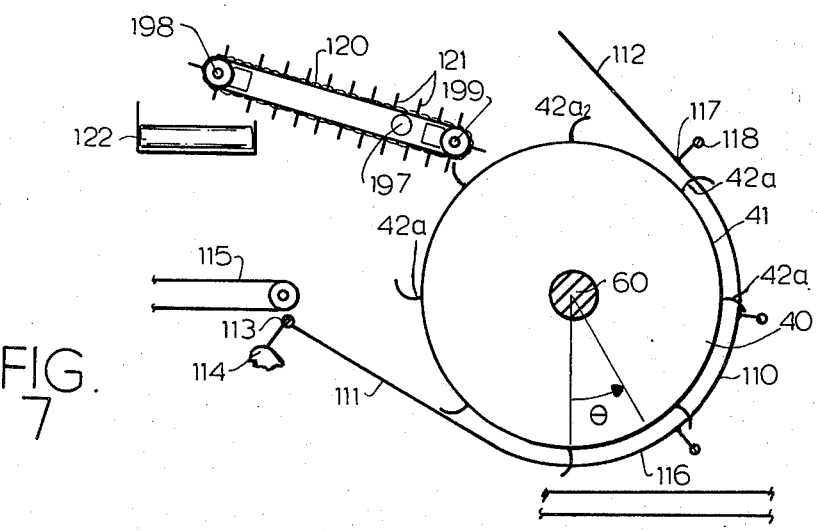

METHOD AND APPARATUS FOR RECOVERING TOMATOES FROM SEVERED VINES, EMPLOYING A ROTATED AND OSCILLATED SHAKER

BACKGROUND OF THE INVENTION

This invention relates to method and apparatus for mechanically removing vegetable products or fruits such as tomatoes from their vines by employing a rotary, oscillatory motion, imparting angular acceleration and deceleration to the fruit as the vines are transported around an arcuate path.

The invention is not limited to tomato harvesting, but tomato harvesting well illustrates the problems involved.

Existing tomato harvesters employ essentially linear shaker beds which oscillate the vine back and forth, while at the same time conveying the vines from the front of the machine to the rear of the machine and discharging the stripped tomato vines off the back of the machine. In some harvesters the shaker beds are inclined, and detachment of the fruit occurs along the beds due to horizontal and vertical components of acceleration imparted to the fruit. In other harvesters the shakers are disposed horizontally and horizontal force components are relied on to detach the fruit from the vines. Both require a relatively long machine and have necessitated a relatively long radius of turning for the harvester.

These prior-art tomato harvesters have generally been used with plants especially bred for use in canning, some of which have been relatively easy to detach. However, some recent varieties of tomatoes have fruit that is relatively difficult to detach.

Among the objects of this invention are the following:

To provide a tomato-harvesting system in which the shaking operation is accomplished in a shorter distance than heretofore.

To impart a new type of action in which an imposition of oscillatory upon rotary motion imparts different combinations of vertical and horizontal motions varying from pure vertical to pure horizontal and in between, so as to change the effect of the shaking on the fruit.

To impart a shaking action which can readily be adjusted in amplitude as well as in frequency to give maximum results, that is, the best compromise between the amount of fruit removal and the protection of the fruit from damage.

To enable the deposit of the vines at any desired location, such as to one side of the row being harvested rather than at the rear of the machine, when such shifting is desired.

To enable the entry and leaving of the vine mass to be at various locations, depending on where the most desirable results are to be achieved.

Other objects and advantages will appear from the following description.

SUMMARY OF THE INVENTION

The basic method of the invention mechanically removes tomatoes from their vines after the vines have been severed from their roots and lifted aboveground. The severed and lifted vines are fed in between a rotary shaker and stationary guides, and the vines are shaken by subjecting them to angular acceleration and deceleration while they are being carried around an arcuate path, to which they are held. The tomatoes shaken from the vines are collected, and the stripped vines disposed of, as by dropping them on the ground.

The shaker apparatus is mounted on a main frame and comprises tomato-vine engaging means supported rotatably by the main frame and having a series of vine-engaging projections extending radially outwardly from a cylindrical envelope. This engaging means may be a cylindrical drum with radial rods extending out from it; it may be a series of aligned and spaced-apart discs with radial rods; it may be a series of parallel spaced-apart rods arranged circularly around a rotational axis. The vine-engaging projections carry the vines around at least a portion of the cylindrical envelope while the vines are retained in the vicinity of the envelope, and while the angular acceleration and deceleration shakes the tomatoes off the vines.

A plurality of flexibly mounted, arcuate, tomato-vine retaining means is supported in a generally stationary position by the main frame adjacent the envelope, for holding the vines in the vicinity of the envelope as the vines are moved around it. These retaining means may be arcuate rods or a combination of rods and straps.

The main frame supports feeding means for feeding the severed and lifted vines in between the envelope and the retaining means. The feeding means may comprise a conveyor or a chute, for example.

The vine-engaging means may be rotated by any suitable rotation means supported by the main frame and imparting a rotational velocity, preferably constant, to the vine-engaging means. In conjunction with this rotation means, oscillation means may be supported by the main frame for imposing on the rotational velocity, as applied to the vine-engaging means, strong angular acceleration and deceleration, so that the vines are accelerated and decelerated angularly as they follow their arcuate path around at least a segment of the envelope. As the vines are carried around the periphery of the apparatus, for example, a drum periphery, the fruit vine mass is thus subjected to acceleration which varies cyclicly both in magnitude and in direction. As a result, tomatoes are shaken from the vine and can then be collected for sorting.

In the past some tests by others of the efficiency of fruit detachment have indicated that vertical motion is less effective than horizontal motion in detaching fruit, but those tests have always been conducted with essentially unrestrained vines. On the other hand, a grower or plant breeder nearly always checks the ease of removal of a given tomato variety by grasping the plant and giving it a single sharp vertical shake. Thus, while a continuous cyclic vertical forcing of a vine, as in the tests, causes an unstable pendulum-type motion of the vine which limits the effectiveness of the shaking operation, the excitation by the grower or breeder is done manually for a single cycle, so that the possibility of producing pendulum motion of the vine is precluded, and the efficiency of removal is increased. The present invention employs the latter principle, in that the vines are held constrained to the drum, both by the drum itself and by smooth, spaced, curved parallel rods positioned near the surface of the drum (or in analogous locations where the shaking apparatus is not actually a drum). This structure precludes the undesirable pendular motion of the vine—while sometimes causing a desirable pendular motion of the fruit and its stem—and therefore gives results different from the test involving pendular motion of the vine. I have found that these results are superior to what is currently in commercial use.

Since the rotary drum, or other rotary apparatus incorporated in this invention, operates by virtue of oscillation taking place at various angular positions of the fruit, the oscillation subjects the tomatoes to whatever mode of vibration is best to remove them; it can therefore operate with minimal energy input and hence also minimal damage to the fruit. This makes possible to achieve adjustments suitable for use in removing fresh market tomatoes as well as for removing various varieties of canning tomatoes. It also makes it possible to have a large initial separation of easily detached fruits followed by later separation of more difficultly detached fruits requiring increased forces of detachment.

Oscillation frequencies vary with the type of fruit being harvested, but generally speaking, frequencies under 200 cycles per minute are sufficient to detach the fruit at travel speeds of 3 miles an hour or more.

The invention makes it possible to introduce the vines to the shaker at various locations. The apparatus may introduce the vines at the bottom of the drum, carrying the vines up and around the rear of the drum and discharging them from the top toward the front of the machine. Vine discharge toward the front of the machine permits continuous visual monitoring of the shaker performance by the harvester operator. Alternatively, a spiral type of vine-retainer may be used so that the vines typically go around more than one revolution, and the discharge is then to one side of the shaker.

The shaker in present machines is rather long, but in the present invention the drum may be only a yard or so in diameter and yet act to replace—and be even more effective than—a shaker bed that is six to nine feet long. This means a shorter harvesting machine with a shorter turning radius can be employed, especially when the tomato sorting is done mechanically.

The rotary shaker of this invention is inherently simpler than the shakers presently in use, and requires less maintenance than standard harvesters because there are fewer moving parts.

BRIEF DESCRIPTION OF THE DRAWINGS

In the drawings:

FIG. 5 is a view in section taken along the line 5—5 in FIG. 4.

FIG. 6 is a fragmentary diagram showing the use of an alternative hydraulic motor system instead of the motor system shown at the bottom of FIG. 4.

FIG. 7 is a view similar to FIG. 5 of a modified form of the invention employing a series of parallel arcuate rods, each lying on a plane transverse to the axis of the drum. Also shown is a modified form of take-off conveyor.

DESCRIPTION OF SOME PREFERRED EMBODIMENTS

Figure 1:
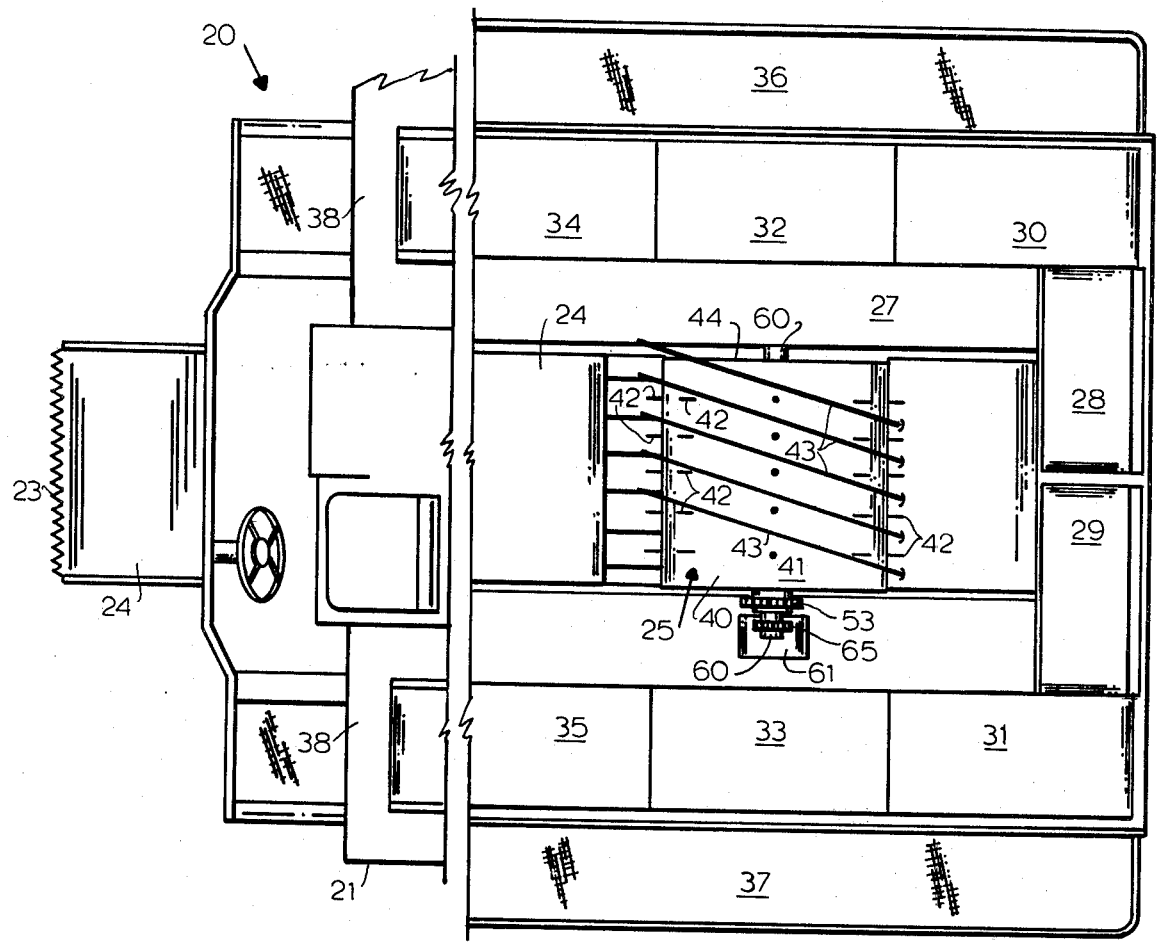
FIG. 1 is a top plan view of a tomato harvester embodying the principles of the invention. The harvester has been broken in the middle in order to conserve space.
Figure 2:
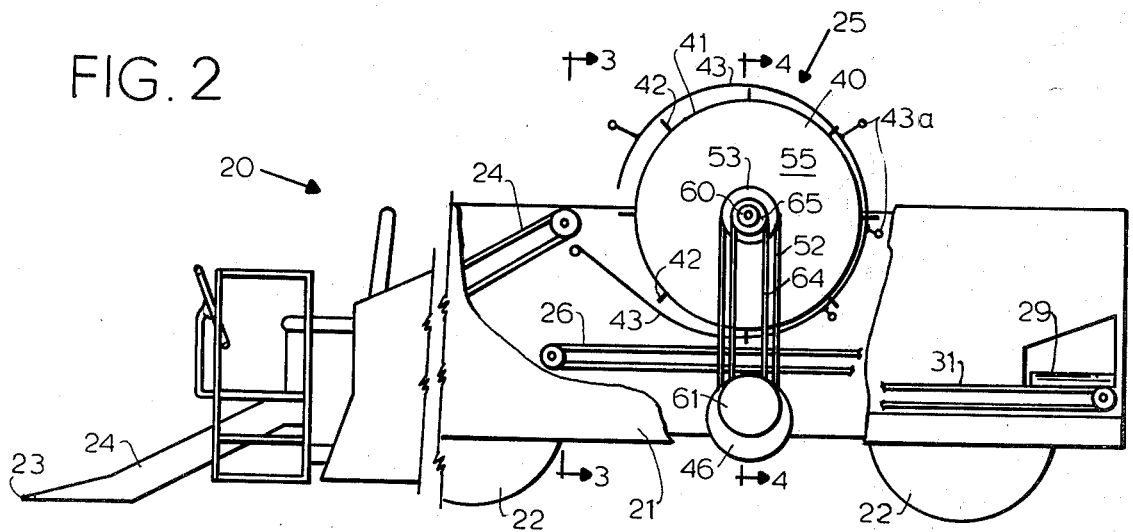
FIG. 2 is a view in side elevation of the harvester of FIG. 1.

The harvester of FIGS. 1 to 5:

FIGS. 1 and 2 illustrate a tomato harvester 20 embodying the principles of the invention. The harvester 20 has a main frame 21 which is carried by wheels 22 and is preferably provided with an engine for self-propulsion.

At the front of the harvester 20 there may be a cutter 23 which is moved along below the level of the soil to cut off the stems of the tomato vines. The cutter 23 delivers the severed tomato vines to a suitable elevator 24 which carries the tomatoes upwardly to a rotary shaker 25. The elevator 24 may comprise a portion at which dirt clods are removed, if desired, along with loose tomatoes, in a well-known manner. The elevator 24 deposits its fruit at the rotary shaker 25 in such a way that fruit cannot fall back down the elevator 24 from the shaker 25.

In conjunction with the shaker 25 there is a collector 26 for the harvested fruit; this may be a conveyor belt, and there may be a well 27 or other means for disposing of the vines from which the fruit has been stripped, as, for example, an overhead transverse conveyor. The leaves and trash go along with the vines. The collected fruit may then pass to rear cross-conveyors 28 and 29, which feed it to forwardly moving conveyors 30 and 31 where there may be manual sorting with people standing on platforms 32 and 33 or mechanical sorting by suitable mechanical sorters 34 and 35, or both, or other systems. From there, conveyors 36 and 37 may deposit the fruit on an output conveyor 38, which may carry the tomatoes to a loading truck, not shown.

The rotary shaker 25 of the invention may take a number of different forms, all of which involve a combination of rotary and oscillatory movement, and also which involve restraining the fruit so that pendular motion of the vine is not developed.

A drum-type rotary shaker (FIGS. 1-5):

For example, as shown in FIGS. 1-5, the rotary shaker 25 may comprise a rotatable drum 40 having a cylindrical surface 41 from which project out radial rods or fingers 42 which engage the vines and help to carry the vines in an arcuate path. Instead of being radial the rods 42 may be bent or curved. They may be placed in line in rows or staggered. In conjunction with the drum 40, there may be a stationary arrangement of arcuate constraining rods 43, which in this instance may have axially extending lead-in portions 45 (extending, for example, from point $P_1$ in FIG. 5 to point $P_2$) followed by spiral segments 45a (extending, for example, from point $P_2$ to point $P_3$ in FIG. 5) that impart a helical motion to the vines, so that while the vines are moving around with the drum 40, they are also moving toward one side 44 of the drum 40. By choice of rods 43, each vine may make a single circuit or less than a single complete circuit around with the drum 40 or may be expelled after several circuits, depending on the best conditions for the particular type of tomatoes being harvested. There may be parallel cross-rods 43a (See FIGS. 2, 4, and 5) at selected locations to increase the detachment efficiency of the fruit, because the stems tend to wraparound these cross-rods 43a and thereby decelerate themselves.

In order to provide both a rotary progress or transportation of the vines and a fruit-detaching angular acceleration and deceleration, the drum 40 may have two types of motion superimposed on it. Such motions may be substantially those illustrated in FIG. 19—constant rotational velocity $\omega_1$ shown as a straight-line parallel to the time axis, while a cosine curve represents a velocity $c\omega_2 \cos \omega_2 t$ varying at all times in amplitude and changing direction, leading to a resultant velocity $\dot{\theta} = \omega_1 + c\omega_2 \cos \omega_2 t$, usually found, but at certain points negative. Similar motions may be used where a zero velocity forward is the lowest velocity reached or where the velocity never quite drops to zero. There are many ways of achieving this, only a few of which need to be shown.

In a presently preferred system two motors are employed. A hydraulic first motor 46 (FIG. 4) is driven by pump 47 via a line 48. The pump 47 may be driven at a constant speed, and its displacement is usually fixed at a desired value, but changeable when desired to vary the speed of the motor 46. The motor 46 has a shaft 50 driving a sprocket wheel 51 and therefore through a chain drive 52, drives a sprocket wheel 53 which may be attached rigidly to a hub 54 of an end disk 55, one of two end disks 55 and 56 of the drum 40. The end disk 55 transmits this rotary motion to the periphery 41 of the drum 40. The drum 40 is rotatably supported by end bearings 57 and 58 on a central shaft 60. Thus, the motor 46 will normally drive the drum 40 at a time-average constant rotary speed $\omega_1$ at a rate proportional to the ground speed of the harvester 20, usually about 30 cycles per minute though it may be at speeds up to 50 cycles per minute for certain kinds of tomatoes.

Superimposed upon what would otherwise be rotary motion at a constant speed, is an oscillatory motion. This may be provided in part by a second motor 61 which need not be hydraulic; it may be powered in any desired manner. The motor 61 rotates at constant speed and has a shaft 62 having a sprocket wheel 63 and, through a chain drive 64, drives a sprocket wheel 65 on the shaft 60. The motor 61 may rotate the shaft 60 at a constant rate, but that rotation is converted into oscillatory motion and transmitted to the drum 40 by any of various suitable ways.

For example, the shaft 60 may drive, by sprocket wheels 66 and 67, a pair of chain drives 68 and 69 that in turn, drive sprocket wheels 70 and 71 secured to off-center shafts 72 and 73, which are journaled in bearings 74,75 and 76,77 in support members 78 and 79 of an inner drum 80, which may be called the inertial drum 80, supported on bearings 80a and 80e. The inertial drum 80 has a heavy cylindrical shell 81 so that its weight, which may be several times (e.g., five times) as great as that of the drum 40, is evenly distributed. However, the shafts 72 and 73 extend beyond the end support members 78 and 79 of the inertial drum 80, though still inside the harvesting drum 40. There, the shafts 72 and 73 have attached cranks 82,83 and 84,85, which are connected by stub shafts 86,87 and 88,89 to respective connecting rods 90,91 and 92,93 that are attached by stub shafts 94,95 and 96,97 to the inner faces of the end plates 55 and 56 of the shaker drum 40. Thus, the relatively constant rotation of the shafts 60, 72, and 73 results in an oscillation of the drum 40, which accelerates and decelerates the rotational velocity of the drum 40.

The magnitude of the oscillatory movement, as well as the magnitude of the rotary movement, may, of course, be varied, as by adjusting the positions of the stub shafts 86, 87, 88, and 89 on the cranks 82, 83, 84, and 85. Each complete revolution of the drum 40 will therefore have superimposed on it several of these oscillations, and their effect on the fruit detachment will vary according to the rotational position of the fruit; that is, when the vine is moving substantially vertically, there will be a strong vertical acceleration and deceleration; when it is moving substantially horizontally there will be a similar horizontal deceleration and reacceleration; and in between there will be combinations of the two. Since the hydraulic motor 46 is connected to the line 48, which serves as a hydraulic spring device, the oscillatory motion is not harmful to the motor 46. The size of the line 48 is carefully chosen so that its resonant frequency is low compared to the frequency of the oscillatory motion.

Figure 3:
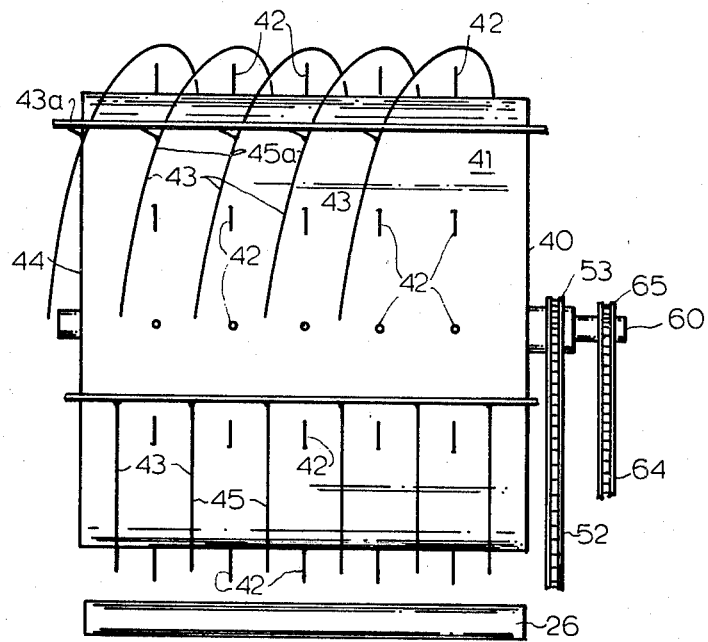
FIG. 3 is a view in section taken along the line 3—3 in FIG. 2.
Figure 4:
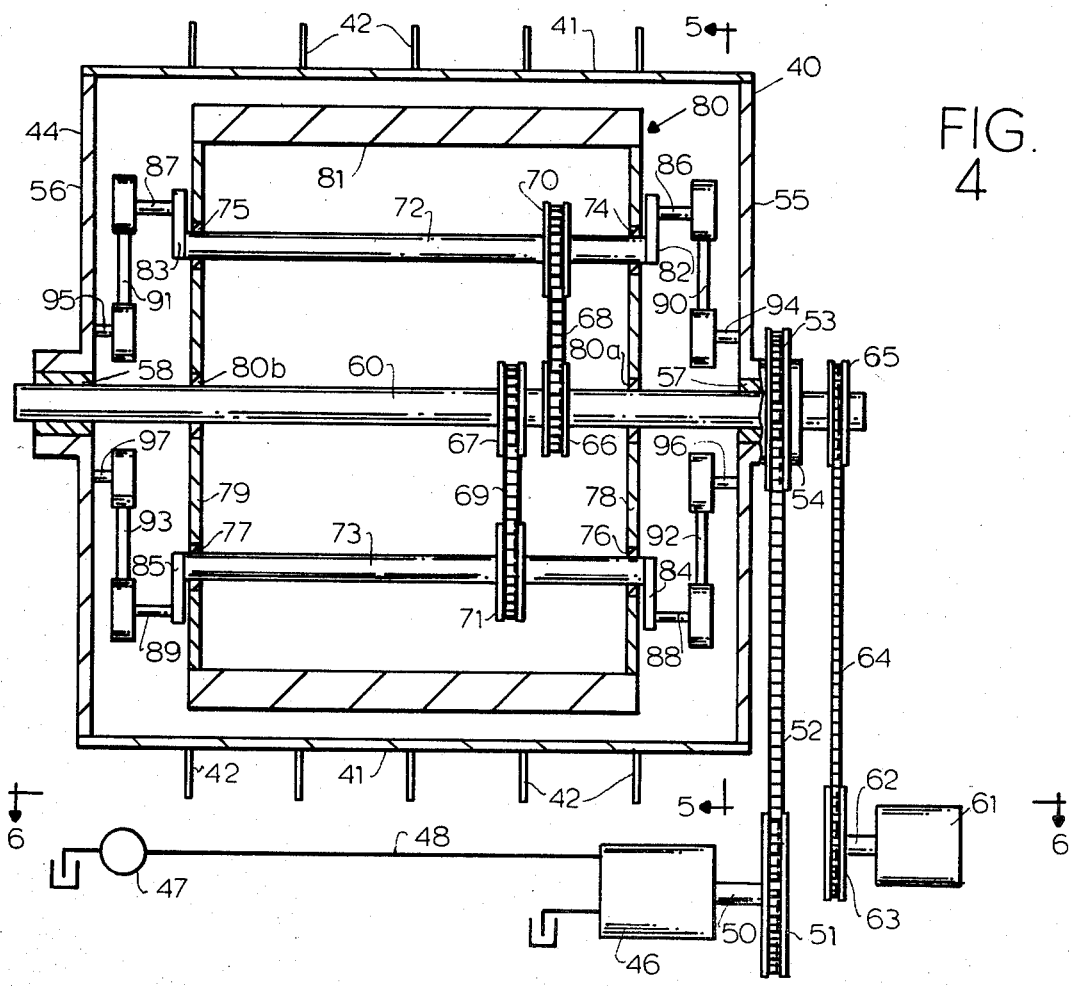
FIG. 4 is an enlarged view taken along the section lines 4—4 in FIGS. 2 and 5.

The hydraulic motor drive of FIG. 6:

The motor drive of the system of FIGS 3-5 may be modified by employing a hydraulic motor 100 (See FIG. 6) in place of the motor 55 to drive the eccentrics at constant angular velocity. A variable volume pump 101 provides the speed or (shaker frequency) control through a line 102. A hydraulic motor 105 with a speed-controlling pump 106 drives the drum 40 at the desired angular velocity, i.e., a time-average angular velocity that corresponds to the ground-travel speed of the harvester 10 along the row. The hydraulic fluid circuit 107 for the motor 105 provides a fluid spring. If desired, an accumulator 108 may be incorporated to provide a softer spring effect. The angular velocity $\theta$ of the shaft of the motor 105 is thus directly proportional to the angular velocity of the drum 40, and is therefore characterized by an expression of the following form:

$$\dot{\theta}_{motor\ 105} = \omega_2 + C \cos \omega_1 t$$

where
- $\omega_1$ = angular frequency of the drive oscillation in radians per second,
- $\omega_2$ = time-average angular velocity of the drum 40 in radians per second
- $t$ = time in seconds
- $C$ = a constant The "stiffness" of the system may be adjusted by proper design of the hydraulic line 107 and can be adjusted to a low value by incorporating the accumulator 108, so as to provide a low system resonant frequency compared to $\omega_1$. The direction of drum rotation is set opposite to the sense of the eccentric drive, thus placing a positive load (pressure) on the motor 105 due to friction in the eccentric drive. In place of the hydraulic spring 107, there may be a torsion spring like the torsion spring 165 of FIG. 16.

Modified systems:

Many modifications can be made in the system just described. There are other ways of providing oscillation and of imposing the oscillation on the rotation. The eccentrics may be driven by a mechanical or electric motor. There are other structures of guiding rods. There are various replacements for drums. To give examples of these, a few of them will be discussed without in any sense intending to limit the scope of the invention.

Figure 8:
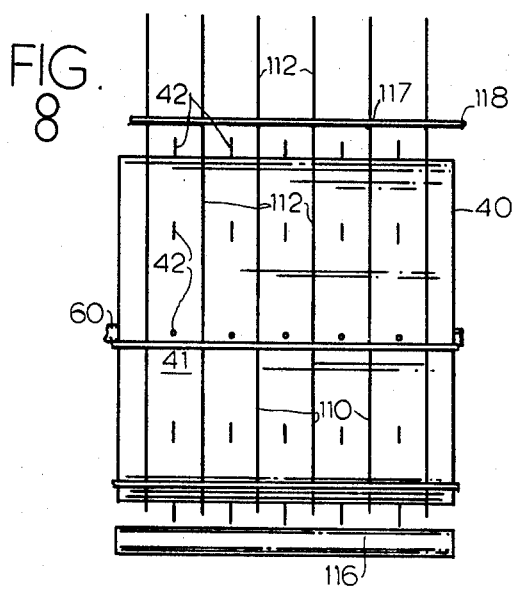
FIG. 8 is a view in rear elevation of the device of FIG. 7.

Some modified types of guide rods (FIGS. 7–11):

FIGS. 7 and 8 show, in place of the spiral segment rods 43 and spiraling movement of the vines, a direct movement of the vines around with a drum 40 provided by arcuate rods 110 lying in planes perpendicular to the shaft 60 and having rectilinear input end 111 and a rectilinear output end 112. The input ends 111 of all the rods 110 are secured to a cross-rod 113 supported rigidly by a bracket 114 secured to the main frame 21 of the harvester 20 or to a sub-frame thereof. The input ends 111 receive the vines and their attached fruit from a conveyor 115 and guides them by gravity to the drum periphery 41 from which is spaced an arcuate portion 116 of the rod 110, describing approximately half of a circle and leading off tangentially to the output portion 112. At about the point of tangency, each rod 110 is secured to a cross-rod 117, which is pivotally attached to a fixed member 118 on the frame 21. This pivotal attachment enables the rod 110 to accommodate the irregularities that may occur from the passage of the vine around the drum 40 between the drum 40 and the rod 110. Curved tines 42a are shown in place of the radial tines 42; these may be used in any form of the invention.

In FIG. 7 the vines are picked up by a two-chain conveyor 120, the chains having tines 121 that engage the vines, pick them off the drum 40 and carry them along a path directed toward the front of the harvester 10. They may then be carried to one side by a cross-conveyor 122 or a chute or can be routed in any desired manner so that the vines are dropped wherever desired.

Figure 20:
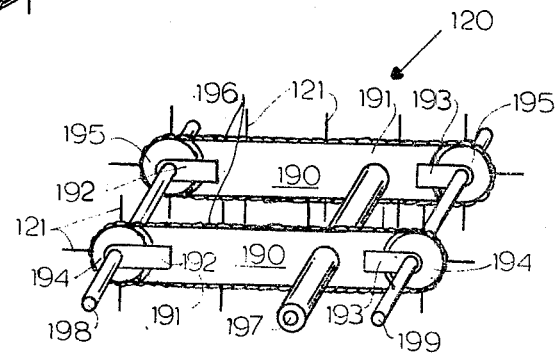
FIG. 20 is an isometric view of the vine pick-off conveyor shown in FIG. 7.

The vine pickoff conveyor 120 of FIG. 7 is shown in more detail in FIG. 20. It comprises multiple parallel assemblies 190, each composed of a main plate 191, two bearing plates 192 and 193 and sprockets 194 and 195, one at each end, carrying a roller chain 196 with the fingerlike projections 121 attached at points along the chain 196. The assemblies 190 are held together by a common support member 197 fixed to the frame 21 of the harvester. A drive shaft 198 is powered by suitable means, for example, by a hydraulic motor (not shown). There is also a support shaft 199. The conveyor 120 is positioned adjacent to the drum surface, and the fingers 121 pick the vines from the rotary drum surface. The velocity of finger travel is at least equal to the tangential (time average) velocity of the drum fingers 42a. The pickoff conveyor 120 is shown in FIG. 7 as located above the point of vine entry to the drum 40. However, the location of the conveyor 120 is not restricted to this point, but is dependent upon the choice of vine movement and the desired exit point.

Figure 9:
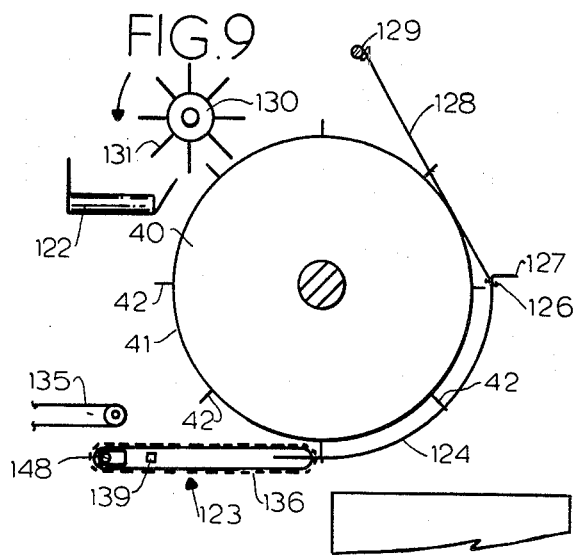
FIG. 9 is a view similar to FIG. 7 of a modified form of rod support, in which a canvas strap is joined to each steel rod. Also, a different conveyor vine-introducing system and a finger-wheel take-off system are shown.

FIG. 9 shows another modified form of the invention in which, in this instance, the vines and fruit are carried by a conveyor 123 to the bottom of the drum 40, at which point an arcuate steel rod 124 is used to confine the mass of vines near the periphery of the drum 40. In the drawing each steel rod 124 is shown extending about 90°, but it may in fact be less, e.g., 45°. Its lower end 125 is pivotally attached to the frame 11 but in a fixed position, while at its upper end 126 and outwardly turned portion 127 is provided, to which is attached a strap 128 of canvas, rope, stranded cables or other highly flexible material, each rod 124 being attached to a separate strap 128. The strap 128 may itself be pivotally attached to the frame 21 at a frame bracket 129. The strap 128 continues the confining of the vines and allows somewhat more flexibility to the rod-strap assembly. Here the vines are again discharged in a direction going back toward the front of the machine, and, by way of example, they are shown taken from the drum 40 by a finger wheel 130 having tines or fingers 131 and are deposited on a cross-conveyor 132.

Figure 11:
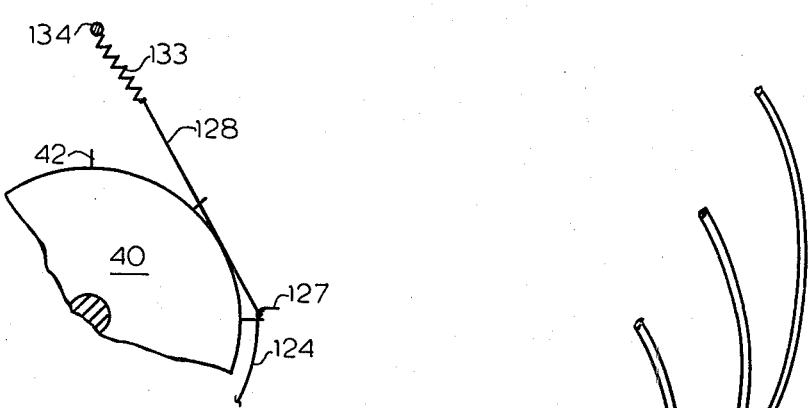
FIG. 11 is a fragmentary view of a device like that of FIG. 9 showing an alternative attachment for the straps.

FIG. 11 shows that the strap 128 of FIG. 9 may, alternatively, be attached to a spring 133, which is, in turn attached to a frame bracket 134 to provide flexibility for the strap-rod assembly. The same spring connection may be used with rods, as with the rods 110 of FIG. 7.

Figure 10:
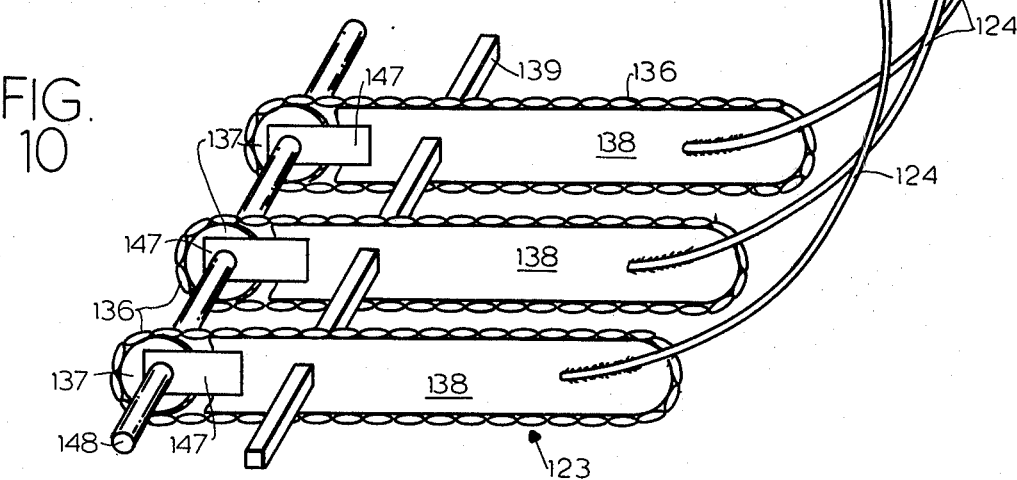
FIG. 10 is an isometric view of a portion of FIG. 9 showing the vine-introducing conveyor and portions of the rods.

FIGS. 9 and 10 also show a different mechanism for introducing the vines to the drum 40. The conveyor 123 receives the vines from a belt conveyor 135. The conveyor 123 itself comprises a plurality of parallel roller chain conveyors 136, each driven by sprocket wheel 137 and supported by a narrow bar 138, which is preferably curved at each end. Each arcuate rod 124 may then be fixed, as by welding, to one side of a bar 138. The bars 138 may be held apart and supported by welding each of them to a rigid cross-bar 139 that is rigidly connected at its ends to the harvester frame 11 (not shown here). Each bar 138 also supports a bearing plate 147, preferably welded to the bar 138, and the plates 147 rotatably support a shaft 148 which is rigidly fixed to the sprocket wheels 137. Other parallel conveying means are, of course, possible.

Figure 12:
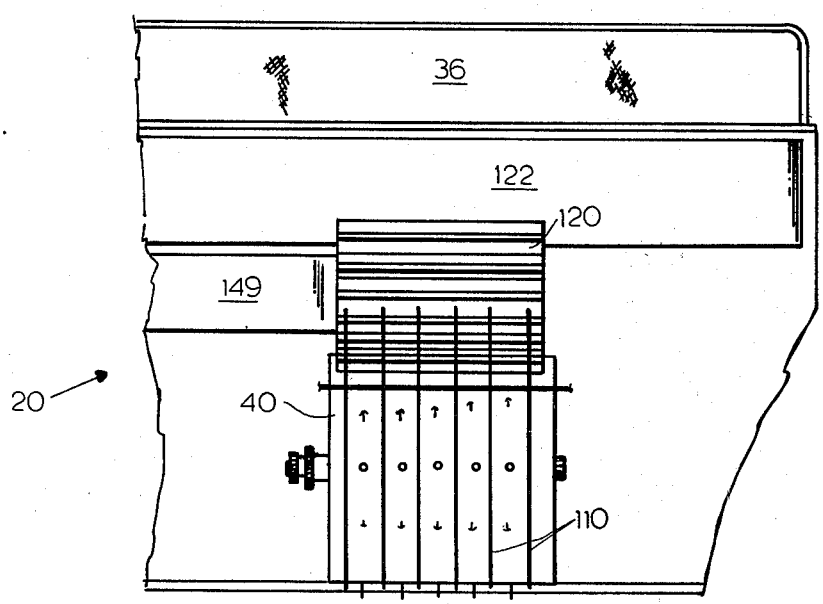
FIG. 12 is a diagrammatic view of the shaker portion of a modified form of harvester having a shaker drum with its axis in line with the forward-rear direction of the harvester.

An axial drum system (FIG. 12):

Instead of the drum 40 being transverse to the forward-rear axis of the harvester, it may be axially in line therewith, or at least extend with its axis parallel to the forward-rear axis of the harvester. FIG. 12 illustrates, diagrammatically, such an arrangement.

The drum 40 in FIG. 12 may be substantially as shown in FIG. 7, as may the rods 110, but the drum 40 is here mounted at 90° to the mounting of FIG. 7. A conveyor 149, which may, if desired, be like the conveyor 123, supplies the vines to the drum 40, which performs its functions exactly as before, even though mounted axially instead of transversely. In FIG. 12 the take-off conveyor 120 is a cross-conveyor, and the conveyor 122 extends parallel to the axis of the harvester.

Figure 13:
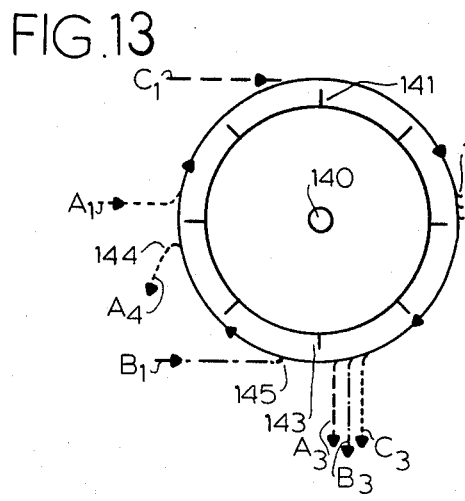
FIG. 13 is a diagrammatic view in side elevation showing entry of the vines at various locations and exits at various locations, relative to the drum, which in this figure rotates clockwise.
Figure 14:
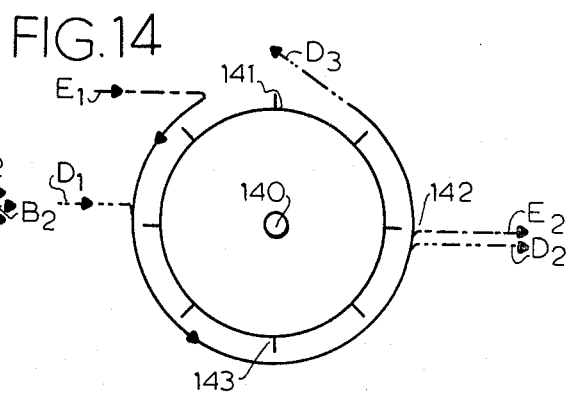
FIG. 14 is a similar view showing some additional entries and exits, the drum in this figure rotating counterclockwise.

Versatility in vine entry and departure (FIGS. 13 and 14):

The diagram of FIGS. 13 and 14 illustrates a few, but only a few, of the possible modification of entry and departure of the vines and fruit. (The restraining rods are omitted from the drawing but are actually present.) For example, in FIG. 13, where the drum 40 rotates clockwise, the vines and fruit may enter at $A_1$, at approximately the horizontal level of the axis 140 of rotation of the clockwise-rotating drum 40, go over the top 141, and the vine may go out at $A_2$ at a level 142 about 180° from its entry on approximately the same plane. Alternatively, the vine may be taken out at $A_3$ at the bottom 143, or the vine may be carried farther around to $A_4$ at a level 144 just below the level 140 and just below the entry point $A_1$.

In a second path, the vines are fed in at $B_1$ at a point 145 near the bottom 143 and, moving clockwise, pass over the top 141 and around, to leave at $B_2$ at the level 142 nearly 270° from their entry or to go around farther and drop to the bottom 143 at $B_3$, nearly 360° from the entrance point.

A third path in FIG. 13 calls for the vines to enter at $C_1$ at the very top 141 and to pass around clockwise either 90°, exiting at $C_2$ at the point 142, or 180° at $C_3$ at the bottom 143.

FIG. 14 shows the drum 40 rotating in the opposite direction, i.e., counterclockwise. By way of further examples, the vines may enter at $D_1$ at the level of the axis 140, then be carried down, held in by suitable restraining rods as described earlier, and taken off at $D_2$ at the level 142 about 180° from the entrance point, or the vines may be carried on around approximately 270° and exit at $D_3$ at the top 141.

In another path shown in FIG. 14, the vines enter at $E_1$ near the top 141 and are carried around and leave at $E_2$ at approximately the forward point 142 of the drum, nearly 270° away from its entrance.

It should be noted that the vines are automatically ejected by centrifugal force at any point where the constraining rods 43 end. However, if desired and as shown in FIGS. 7 and 9, they may be doffed by a take-off conveyor 120 finger wheel 130 rotating at constant velocity.

Figure 15:
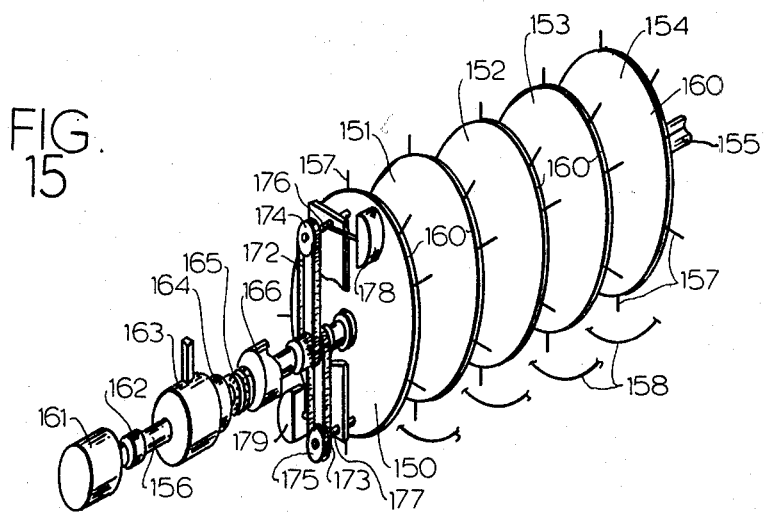
FIG. 15 is an isometric view of a modified form of device embodying the invention, in which the drum is replaced by a series of coaxial circular discs defining a cylindrical envelope.
Figure 16:
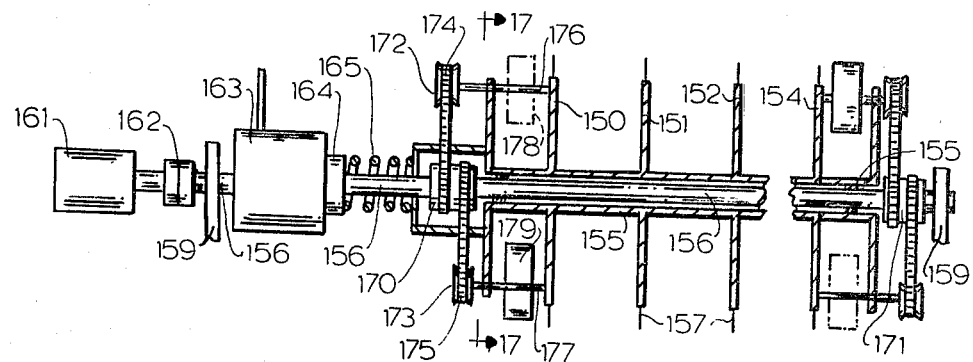
FIG. 16 is a view in side elevation and partly in section of a portion of the device of FIG. 12.

Cylindrical envelopes without drums (FIGS. 15 to 18):

It is not necessary to use drums for the device; although drums are very convenient. FIGS. 15 and 16 show one way in which the drum 40 can be replaced by a substantially equivalent structure. In this instance, a series of coaxial, circular disks 150, 151, 152, 153, and 154 are spaced apart from each other and all are mounted on a cylindrical hub 155 that is rotatably mounted around a main drive shaft 156. Again, a constant rotary motion is provided and on that an oscillatory motion is superimposed, one way of doing this being described below.

Each disk 150, 151, 152, 153, 154 carries a series of rods 157 extending radially out from it, and there are curved vine support rods 158 which may be in any of the forms shown heretofore or may even be different. The peripheries 160 of the disks describe a cylindrical envelope, geometrically speaking, so that the operation is substantially the same as before except that no reliance is made on a drum surface. For this form of the device the vines again may be put in at any desired location, for example, at the forward side, and may exit at any desired location, e.g., at the rear, with the tomatoes falling off on their way and on to a collecting conveyor. Most of them fall off very quickly, others fall off later.

Figure 17:
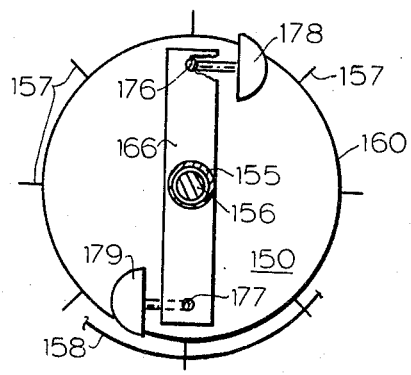
FIG. 17 is a view in section taken along the line 17—17 in FIG. 16.

The superposition of oscillatory motion on constant angular velocity rotation may be achieved in many different ways. One such way is shown in FIGS. 15-17. A motor 161 is joined by a suitable coupler 162 to the main drive shaft 156 and drives it at a constant angular velocity, the shaft 156 being supported by bearings 159 (FIG. 16) that are supported by the harvester frame 11. A second motor 163 may be mounted around but not coupled to the shaft 156 and has a hollow shaft 164. A torsion spring 165 is mounted around the shaft 156 but not coupled to it; one end of the spring 165 is secured to the hollow shaft 164, and its other end is secured to a vibrator frame 166. The vibrator frame 166 is secured to the hub 155 to which the disk 150,151, etc., are all secured. In place of the torsion spring 165 a hydraulic spring like that of FIG. 6 may be used.

Pulley wheels 170 and 171 are secured to the shaft 156 and driven by it and are connected by respective belts 172 and 173 to pulley wheels 174 and 175, which are mounted on respective shafts 176 and 177. The shafts 176 and 177 are supported by the vibrator frame 166, and an eccentric weight 178,179 is mounted on each shaft 176,177. An identical device may (as shown in FIG. 16) be mounted at the other end of the hub 155 in alignment with the one just described.

Figure 19:
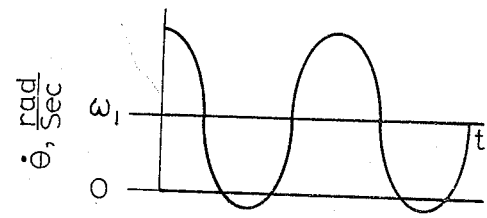
FIG. 19 is a diagram indicating the motion of a drum or similar member as a result of the superimposition of oscillation on the constant rotational speed.

The torsion spring 165 coupling enables the oscillations caused by the rotation of the vibration assemblies to be imposed on the hub 155 and its disks without damage to either motor 161 or 163. The motion may be similar to what is shown in FIG. 19, with angular acceleration and deceleration.

Figure 18:
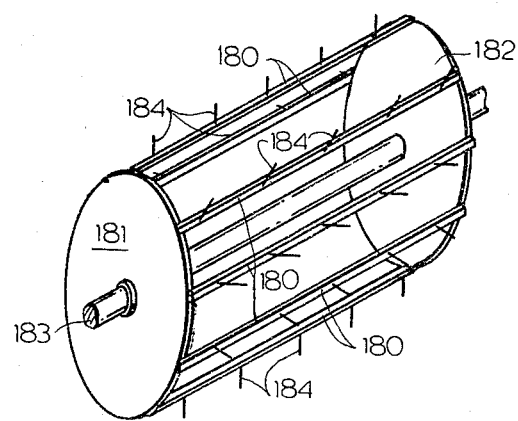
FIG. 18 is a view in perspective of another modified form of the invention in which the drum is replaced by a series of axially-extending rods defining a cylindrical envelope.

FIG. 18 shows yet another form of device which does not require a drum. In this instance, a cylindrical envelope is provided by a series of parallel axially-extending rods 180. Extending between end disks 181 and 182 around a shaft 183, the rods 180 have secured to them radially outwardly-extending rods 184 to act to engage the vine. This device is used in conjunction with suitable guide rods for holding the fruit substantially in the area of the cylindrical envelope. A suitable eccentric operating system is provided, as in FIG. 16; there may be such a system at each end of the series of rods 184, preferably out of the path of the vines and shielded from them. The entrance may be just above the horizontal plane through the axis of the shaft 183, and the exit of the vines near the rearward part or at the bottom.

Summary of the principal features of the invention:

An important feature of the invention is that the vines are constrained between the cylindrical envelope or drum surface 41 and guide rods 43 or 110 or 131 or 150, and the vines always remain in contact with the fingers 42 or 157 or 184, which, radial or bent, placed in-line or staggered, positively force the vines to move in a circular path. The guide rod spacing lets the fruit hang on its stems away from the fingers during vine motion and thus renders the fruit less subject to damage. The fruit is thus subject to continuously varying acceleration vectors (varying in both magnitude, $$\ddot{\theta} = c\omega_1^2 \sin \omega_1 t$$

where $\ddot{\theta}$ = angular acceleration in radians per second
$\omega_1$ = circular frequency of oscillation
c = a constant t = time in seconds
and direction,
$$\theta = \sin\omega_2 t$$

where t = time
$\theta$ = angular position of the drum in radians at $t = 2\pi/\omega_1$, (the angle $\theta$ is illustrated in FIG. 7)
$\omega_2$ = constant angular velocity of the drum in radians per second)

resulting in both horizontal and vertical acceleration on the fruit as the vine mass moves around the periphery of the drum, the fruit-stem system undergoing pendular-type motion with a tendency towards instability of motion as the acceleration vector rotates from the horizontal to the vertical orientation. (This desirable pendular-type motion of the fruit is in contrast to the undesirable pendular-type motion of the entire vine, as when an unconstrained vine is shaken up and down vertically.)

The oscillation frequency and/or amplitude may be variable to accommodate different varieties, and the time average angular velocity of the drum may also be variable to accommodate varying travel speeds along the row.

The drum may be driven by a mechanical eccentric system, by rotating eccentric masses (as per Studer U.S. Pat. No. 3,413,789). Coupling of drum drive may be through flexible members such as coil or torsion spring, helical, or fluid springs.

The drum itself may be, as shown in FIGS. 1–12, of rigid construction with no parts of the drum moving relative to other drum parts, or the "drum" may be a series of stacked disks (FIGS. 15–17), each disk having fingers oriented in a radial sense. The "drum" may be a series of parallel rods (FIG. 18), each parallel to the axis of rotation and locked between end plates. The drum may, of course, have a continuous solid surface such as one from light gauge sheet metal.

The guide rods may be constrained by pivoted joints at each end to accommodate variations in vine size or may be pivoted at one end and constrained by tension springs at the other end, again to permit some flexibility in the guide rod position with respect to the drum surface.

The guide rods may be formed in such a fashion as to apply a lateral force to the vines at a point of discharge near the top of the drum, so that the vines are caused to progressively move laterally along the drum surface during multiple rotations of the drum and eventually are discharged laterally from the drum.

Parallel cross bars 45 may be located at selected points around the drum periphery to increase the detachment efficiency of the fruit due to the stems wrapping around the rods 45.

The point of vine entry to the drum is variable at will be the designer to permit top, side, or bottom loading; and the point of vine discharge is likewise variable, depending on the orientation chosen for point of entry. The direction of rotation of the drum may be either clockwise or counterclockwise (See FIGS. 13 and 14).

The fruit-vine mass may be introduced to the drum by a conveyor directly onto the top of the drum (for top loading), or onto extensions of the guide rods tangentially oriented to the drum for side loading, or onto a second conveyor mechanism composed of laterally spaced belt or chain conveyors, each being substantially in line with its corresponding guide rod for bottom loading, this latter configuration allowing the fruit to land between the belts or chains and away from the fingers.

The vines may be either automatically ejected by centrifugal force at the end of operating cycle or doffed from the drum by a rotating finger wheel or tined conveyor, the angular velocity of which is constant (See FIGS. 7 and 9).

A padded surface (flat or round) may be provided in the area surrounding the detachment zone to serve as fruit decelerators.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for mechanically harvesting a crop from a vine or like plant after the vines have been severed from their roots and lifted aboveground, comprising
    shaking the vines by subjecting them to angular acceleration and deceleration while transporting said vines around an arcuate path about an horizontal axis and while holding said vines in said arcuate path,
    collecting the crop shaken from the vines, and
    disposing of the stripped vines.

2. A method for mechanically removing tomatoes from their vines after the vines have been severed from their roots and lifted aboveground, comprising
    shaking the vines by subjecting them to angular acceleration and deceleration while transporting said vines around an arcuate path about an horizontal axis and while holding said vines in said arcuate path,
    collecting the tomatoes shaken from the vines, and
    disposing of the stripped vines.

3. A method for mechanically removing tomatoes from their vines after the vines have been severed from their roots and lifted aboveground, employing a harvester moving along rows of tomato vines, comprising
    feeding the severed and lifted vines in between stationary guides, and a rotary shaker having its axis horizontal and transverse to the direction of movement of said harvester,
    shaking the vines by subjecting them to angular acceleration and deceleration while transporting said vines around an arcuate path around said axis and while holding said vines in said arcuate path,
    collecting the tomatoes shaken from the vines, and
    disposing of the stripped vines.

4. The method of claim 3 wherein said shaking step comprises
    applying a constant angular velocity and
    superimposing on said constant angular velocity a periodic angular velocity.

5. A method for mechanically removing tomatoes from their vines after the vines have been severed from their roots and lifted aboveground, employing a harvester moving along rows of tomato vines, comprising
    feeding the severed and lifted vines in between stationary guides and a rotary shaker having its axis horizontal and in line with the direction of movement of said harvester,
    shaking the vines by subjecting them to angular acceleration and deceleration while transporting said vines around an arcuate path around said axis and while holding said vines in said arcuate path, collecting the tomatoes shaken from the vines, and disposing of the stripped vines.

6. The method of claim 5 wherein said shaker is actuated by applying a constant angular velocity and superimposing on said constant angular velocity a periodic angular velocity.

7. In a mechanical crop harvester, a shaker for removing the crop from its vines or vine-like plants after the vines have been severed from their roots and lifted above-ground, comprising shaking means for carrying said vines around an arcuate path while subjecting them to angular acceleration and deceleration, retention means for holding said vines in correspondence with said shaking means, feeding means for feeding the severed and lifted vines in between said shaking means and said retention means, collection means for collecting the crop shaken from the vines, and disposal means for freeing the vines from the shaking means after the crop has been shaken therefrom.

8. In a mechanical tomato harvester, a shaker for removing the tomatoes from their vines after the vines have been severed from their roots and lifted above-ground, comprising shaking means for carrying said vines around an arcuate path while subjecting them to angular acceleration and deceleration, retention means for holding said vines in engagement with said shaking means, feeding means for feeding the severed and lifted vines in between said shaking means and said retention means, collection means for collecting the tomatoes shaken from the vines, and disposal means for freeing the shaking means from the vines after the tomatoes are shaken therefrom.

9. In a mechanical tomato harvester, a shaker for removing the tomatoes from their vines after the vines have been severed from their roots and lifted above-ground, comprising a main wheel-supported harvester frame, shaking means supported by said frame for carrying said vines around an arcuate path lying around a horizontal axis transverse to said frame, while subjecting them to angular acceleration and deceleration, retention means supported in a stationary position by said frame, adjacent to said shaking means, for holding said vines in engagement with said shaking means, feeding means supported by said frame for feeding the severed and lifted vines in between said shaking means and said retention means, collection means supported by said frame for collecting the tomatoes shaken from the vines, and disposal means supported by said frame for freeing the shaking means from the vines after the tomatoes are shaken therefrom.

10. In a mechanical tomato harvester, a shaker for removing the tomatoes from their vines after the vines have been severed from their roots and lifted above-ground, comprising a main frame, tomato-vine engaging means for engaging said vines, supported rotatably by said main frame and having a series of vine-engaging projections extending outwardly from a cylindrical envelope, a plurality of flexibly mounted, arcuate tomato-vine retaining means supported in a generally stationary position by said main frame adjacent said envelope, for retaining the vines in engagement with said tomato-vine engagement means, feeding means supported by said main frame for feeding the severed and lifted vines in between the envelope and said retaining means, whereby the vine-engaging projections carry the vines around at least a portion of the envelope while they are engaged by said engaging means, rotation means supported by said main frame and connected to said tomato-vine engaging means for imparting constant rotational velocity to said engaging means, oscillation means supported by said main frame for imposing on said constant rotational velocity a periodic angular velocity so that the vines are angularly accelerated and decelerated as they follow their arcuate path around at least a segment of the envelope, whereby tomatoes are shaken therefrom, collection means supported by said main frame for collecting the tomatoes shaken from the vines, and disposal means supported by said main frame for receiving the vines from said engaging means after they have completed their journey therealong and for guiding them back to the ground.

11. The harvester of claim 10 wherein said tomato-vine engaging means comprises a cylindrical drum with rods extending out therefrom.

12. The harvester of claim 11 wherein said rotation means comprises a hydraulic motor carried by said main frame, a positive displacement pump carried by said main frame and connected to said motor and driven at a constant speed, drive means connecting said hydraulic motor to said cylindrical drum, and spring means connected to said motor for enabling said drive means to receive oscillations from said drum without interfering with said motor.

13. The harvester of claim 12 wherein said spring means comprises a hydraulic conduit connecting said pump to said motor and serving also as a hydraulic spring therefor.

14. The harvester of claim 12 wherein said oscillation means comprises a drive shaft supporting said cylindrical drum so that the drum rotates freely thereabout, an inertial drum having end walls and supported rotatably by said drive shaft inside said cylindrical drum and weighing several times as much as said cylindrical drum, a second motor for driving said drive shaft at a constant speed, a pair of off-center shafts supported between the end walls of said inertial drum and extending therebeyond, drive-connecting means connecting said off-center shaft to said drive shaft, said cylindrical drum having end plates, and crank means connecting said end plates of said cylindrical drum to each of said off-center shafts.

15. The harvester of claim 14 wherein said second motor is also a hydraulic motor.

16. The harvester of claim 11 wherein said drum has its axis transverse to the forward-rear axis of the harvester.

17. The harvester of claim 11 wherein said drum has its axis extending parallel to the forward-rear axis of the harvester.

18. The harvester of claim 10 wherein said tomato-vine engaging means comprises a series of axially aligned, identical disks spaced axially apart from each other and joined for rotation and oscillation together, with rods extending out from the disks.

19. The harvester of claim 18 wherein said rotation means and said oscillation means comprise
- a first hollow drive shaft, to which all said disks are rigidly secured,
- a second drive shaft extending inside and coaxial with said first drive shaft,
- a first motor operated at a constant speed,
- spring means connected to said first motor,
- a second motor operated at a constant speed,
- a plurality of additional shafts secured eccentrically to at least one said disk,
- a plurality of eccentrically mounted weights, mounted on said additional shafts, and
- transmission means connecting said second motor to said additional shafts for rotating said eccentrically mounted weights.

20. The harvester of claim 19 wherein said spring means is a torsion spring connecting said first motor to said first drive shaft.

21. The harvester of claim 19 wherein the weights are in pairs located to provide dynamic balance.

22. The harvester of claim 10 wherein said tomato-vine engaging means comprises a series of rods parallel to each other arranged circularly around and parallel to an axis of rotation, with rods extending out radially therefrom.

23. The harvester of claim 10 wherein said plurality of retaining means comprises a series of parallel rods, each lying in a plane perpendicular to the axis of said envelope.

24. The harvester of claim 10 wherein said plurality of retaining means comprises a series of parallel rods, each having a portion lying in a plane inclined to the axis of said envelope, for directing the vines along a path that takes them in a direction along that axis while they are moving arcuately.

25. The harvester of claim 10 wherein said vine-engaging projections are rods extending out from said envelope.

26. In a mechanical tomato harvester, a shaker for removing the tomatoes from their vines after the vines have been severed from their roots and lifted above-ground, comprising
- a main frame,
- a cylindrical drum supported rotatably by said main frame and having a series of vine-engaging projections extending outwardly from a cylindrical outer periphery,
- a plurality of flexibly mounted arcuate rods supported by said main frame adjacent said periphery,
- feeding means supported by said main frame for feeding the severed and lifted vines in between the drum periphery and said arcuate rods, whereby the vine-engaging projections carry the vines around at least a portion of the drum periphery, while the rods hold the vines against said periphery,
- rotation means supported by said main frame and connected to said drum for imparting a constant rotational velocity to said drum,
- oscillation means supported by said main frame for imposing on said constant-rotational velocity a periodic angular velocity so that the vines are accelerated and decelerated as they follow their arcuate path around the drum, whereby tomatoes are shaken therefrom,
- collection means supported by said main frame for collecting the tomatoes shaken from the vines, and
- disposal means supported by said main frame for receiving the vines from said drum after they have completed their journey therearound and for guiding them back to the ground.

27. The harvester of claim 26 wherein said vine-engaging projections are rods extending radially out from said drum.

28. The harvester of claim 26 wherein said vine-engaging projections are curved rods extending out from said drum and curving away from the direction of rotation.

29. The harvester of claim 26 wherein said arcuate rods lie in planes parallel to each other and inclined relatively to the said drum.

30. The harvester of claim 26 wherein said arcuate rods lie in planes parallel to each other and perpendicular to the axis of the drum.

31. The harvester of claim 30 wherein flexible straps are secured at one end of each said rod and at the other end to said main frame.

32. The harvester of claim 30 having a flexible strap secured at one end to one end of each said rod and a spring connecting the other end of each said strap to the frame.

33. The harvester of claim 30 wherein the outbound ends of the rods are connected to the frame through spring means.

34. The harvester of claim 26 wherein said feeding means comprises a conveyor beneath said drum having a series of parallel roller chain conveyors, each supported by a narrow bar to which are secured one end of said rods.

35. The harvester of claim 26, wherein said collection means comprises a tined take-off conveyor above said drum and a parallel roller chain conveyor on which said tined take-off conveyor deposits said vines.

36. In a mechanical tomato harvester, a shaker for removing the tomatoes from their vines after the vines have been severed from their roots and lifted above-ground, comprising
- a main frame,
- main shaker shaft means,
- a series of identical disks mounted on tomato-vine engaging means, said main shaker shaft means being spaced apart, with their peripheries lying along an imaginary cylindrical envelope, each disk having a series of vine-engaging projections extending outwardly from the cylindrical envelope,
- plurality of flexibly-mounted arcuate tomato-vine retaining means supported in a generally stationary position by said main frame adjacent said envelope, for retaining the vines in the vicinity of said envelope,
- feeding means supported by said main frame for feeding the severed and lifted vines in between the envelope and said retaining means, whereby the vine-engaging projections carry the vines around at least a portion of the envelope while they are retained in the vicinity of said envelope, rotation means supported by said main frame and connected through said main shaker shaft to said disk for imparting to them a constant rotational velocity, oscillation means supported by said main frame and converted to said disks for imposing on said constant rotational velocity a periodic angular velocity, so that the vines are accelerated and decelerated as they follow their arcuate path around at least a segment of the envelope, whereby tomatoes are shaken therefrom, collection means supported by said main frame for collecting the tomatoes shaken from the vines, and disposal means supported by said main frame for receiving the stripped vines and for guiding them back to the ground.

37. In a mechanical tomato harvester, a shaker for removing the tomatoes from their vines after the vines have been severed from their roots and lifted aboveground, comprising a main frame, tomato-vine engaging means for engaging said vines, supported rotatably by said main frame and comprising a series of parallel rods set around a cylindrical envelope and having a series of vine-engaging projections extending outwardly from the cylindrical envelope, a plurality of flexibly mounted, arcuate tomato-vine retaining means supported in a generally stationary position by said main frame adjacent said envelope, for retaining the vines in the vicinity of said envelope, feeding means supported by said main frame for feeding the severed and lifted vines in between the envelope and said retaining means, whereby the vine-engaging projections carry the vines around at least a portion of the envelope while they are retained in the vicinity of said envelope, rotation means supported by said main frame and connected to said tomato-vine engaging means for imparting a constant rotational velocity to said engaging means, oscillation means supported by said main frame for imposing on said constant rotational velocity a periodic angular velocity so that the vines are accelerated and decelerated as they follow their arcuate path around at least a segment of the envelope, whereby tomatoes are shaken therefrom, collection means supported by said main frame for collecting the tomatoes shaken from the vines, and disposal means supported by said main frame for receiving the vines from said tomato-vine engaging means after they have completed their journey therealong and for guiding them back to the ground.

* * * * *